July 20, 1948.  W. C. LANG  2,445,675
APPARATUS FOR PRODUCING COATED
WIRES BY CONTINUOUS PROCESS
Original Filed Nov. 22, 1941  5 Sheets-Sheet 1

INVENTOR
William C. Lang
BY William B. Jaspert
ATTORNEY

July 20, 1948.                    W. C. LANG                    2,445,675
                       APPARATUS FOR PRODUCING COATED
                            WIRES BY CONTINUOUS PROCESS
Original Filed Nov. 22, 1941                                 5 Sheets-Sheet 2

INVENTOR
William C. Lang
BY William B. Jaspert
ATTORNEY

INVENTOR
William C. Lang
BY
William B. Jaspert
ATTORNEY

July 20, 1948.  W. C. LANG  2,445,675
APPARATUS FOR PRODUCING COATED
WIRES BY CONTINUOUS PROCESS
Original Filed Nov. 22, 1941  5 Sheets-Sheet 4

INVENTOR
William C. Lang
BY
William B. Jaspert
ATTORNEY

Patented July 20, 1948

2,445,675

UNITED STATES PATENT OFFICE 2,445,675

APPARATUS FOR PRODUCING COATED
WIRE BY CONTINUOUS PROCESS

William C. Lang, Willoughby, Ohio

Original application November 22, 1941, Serial No.
420,086, now Patent No. 2,370,973, dated March
6, 1945. Divided and this application June 20,
1944, Serial No. 541,207

5 Claims. (Cl. 204—209)

This invention relates to process and apparatus for producing or coating ferrous or non-ferrous metallic wire, and more especially to the simultaneous alternate steps of preparing wire for electroplating and drawing of metallic coatings on a metallic wire. The present application is a division of my Patent 2,370,973, granted March 6, 1945.

It was shown by Gibbs in United States Patent No. 1,120,191 that wires could be electroplated with layers of metal, then subjected to a drawing operation; and after subsequent cleaning and pickling operations this procedure could be repeated; thus producing metallic wires by elongation of the electroplated metal on the wires. His equipment consisted of tanks for cleaning, pickling, and electroplating, followed by a wire-drawing apparatus. This repetition of alternate electroplating and drawing reduced the formation of nodules and roughness on the electro-deposit, such as would hinder subsequent drawing operations.

In the present day processes for electroplating coatings on wire, the wire is usually electroplated by passing it through a tank containing the plating solution which requires considerable floor space. Electrical contact to the wire is made at intervals by the use of "fingers" or bars on which the wire rubs, or by metallic contact rolls which rotate as the wire passes over them. In either case, the contacts are electrical conductors and are troublesome, due to the deposition of metal on the contact material, the scratching of the coating of the wire, or the contact voltage drop at high cathode current densities. It is also customary to use soluble or insoluble anodes in the bottom of the plating tank only, producing a far from uniform coating distribution around the circumference of the wire, such depending on the "throwing power" of the solution used. The present-day installations for electro-coating wire have an appreciable distance from anode to cathode, causing a considerable voltage drop between the two through the solution. There is an appreciable solution drag-out and loss with the wire when it leaves the plating tank, and the solution spray due to gas evolution with insoluble anodes is troublesome. The solution is open to the atmosphere and subject to oxidation and dirt accumulation. Another disadvantage, assuming that the tank anodes are placed equidistant from all points of the wire, as is usually the case, is the variation of current density on the wire in the space between the cathode current contacts. With the above difficulties or disadvantages in mind, the present invention makes use of lengths of circular pipe which form an ideal arrangement for the annealing, cleaning, pickling, and plating of wire, the pipes serving as chambers and electrodes for heat treating, cleaning, pickling, and plating operations.

It is among the objects of the present invention to provide a suitable process and apparatus for simultaneous electroplating and drawing of electroplated coatings on wire, which are suitable for continuous operation, applied to the production or coating of wire.

It is a further object of the invention to provide a wire production or coating apparatus adaptable to very high rates of plating-solution circulation around the wire, with no loss of solution from drag-out on the wire.

It is still another object of the invention to provide in a continuous process the desired steps of annealing, cleaning, pickling, electroplating, drawing, and heat treating for the production or coating of wire in a completely closed system requiring a minimum of floor space.

Another object of the invention is to provide a process for the production of heavy, ductile, lustrous, smooth, tightly adherent coatings on wire.

The invention will become more apparent from a consideration of the accompanying drawings constituting a part hereof in which like reference characters designate like parts and in which.

The invention will now be described with reference to the structure shown in Fig. 1. For the sake of simplicity, alphabetical reference characters will be employed to designate the series of treating chambers, so that the use of any number of different kinds of treating chambers will be at once apparent from an inspection of the several figures of the drawings. It will also be evident that different treating chambers and treating solutions may be used in multiples of the same treating apparatus.

Figure 1:
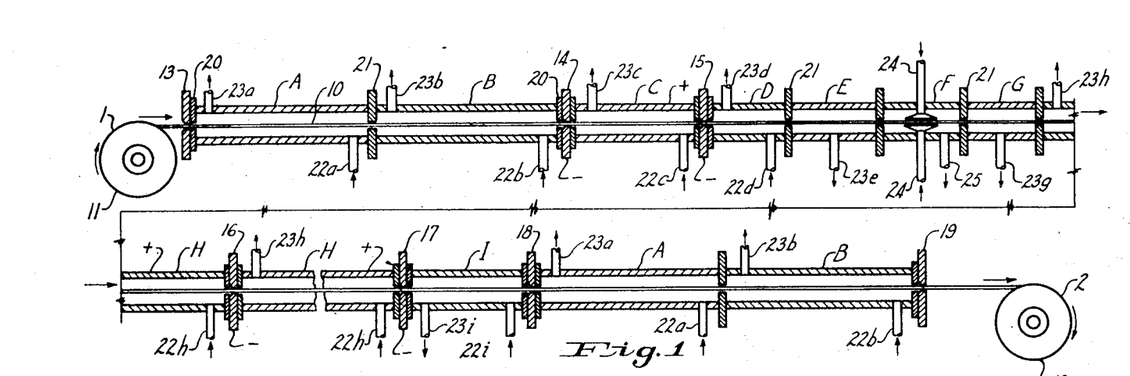
Fig. 1 is a vertical cross-sectional view in two parts of one type of apparatus for coating a metallic wire embodying the principles of this invention.

With reference to Fig. 1, A designates a heat treating, annealing or normalizing chamber, two of which are employed; B, cooling chambers, of which two are used in the apparatus of Fig. 1; C, an electro-cleaning chamber; D, a pickling chamber; E, a recovery chamber; F, a rinsing chamber; G, a plating solution recovery chamber; H, plating sections; and I, a rinsing section.

All of the chambers are of tubular form. Chambers A and B are preferably constructed of heat resistant material such as alloy steel, or they may be of refractory composition.

Chamber C is preferably constructed of a current conducting material, resistant to attack from the cleaning medium.

Chamber D consists of an acid-resistant pipe.

Chamber E is likewise of an acid-resistant pipe.

Chamber F may be constructed of standard steel or iron pipe section as it acts merely as a container for rinsing with water.

Chamber G is constructed of a chemical-resistant material.

Chambers H act as insoluble anodes for plating the wire, and their materials of construction are determined by the nature of the plating solution used.

Chamber I, which is a final rinsing section, may be constructed of ordinary pipe.

The wire to be treated is designated by the numeral 10, and is fed through the apparatus from a pay-off reel 11 to a wind-up reel 12, the latter being power driven although the wire 10 may be otherwise propelled through the apparatus.

The numerals 13, 14, 15, 16, 17, 18 and 19 designate drawing dies through which the wire is successively drawn, preceding and following the treating steps.

The die plates are of a heat-resisting hard alloy and are solution-resistant as well. Gasket seals 20 are provided to partition the chambers adjacent the dies. There are also spacer seals 21 which provide a non-rubbing opening of close clearance for passage of the wire. The pipe forming section C is connected positive to a source of direct current, as indicated, and the dies 14 and 15 are cathodically connected to a source of direct current, as indicated.

The plating sections H are likewise connected to a positive source of direct current, and dies 16 and 17 are negatively connected to a source of direct current. Solutions are circulated in the respective treating chambers by means of inlet connections 22a, 22b, 22c, 22d, 22h and 22i, and outlet connections 23a, 23b, 23c, 23d and 23h, the latter being at the top of the chamber to avoid entrapment of air, except in the rinsing and solution recovery sections wherein the outlets are at the bottom of the chambers, as shown at 23e, 23g and 23i.

In the rinsing chamber F, the wire is sprayed with the water through spray pipes 24 and is drawn off through pipe 25. This chamber is not kept full, so as to give effect to the spray.

The process of coating a metallic wire with a similar or dissimilar metallic coating as carried out by the apparatus shown and described in connection with Fig. 1 of the drawing is as follows.

The wire passing through chamber A is suitably heat treated to anneal it or normalize it, and is passed into chamber A from the pay-off reel 11 through die 13. It then passes through the heat resistant seal 21 into the cooling chamber B. The heating and cooling chambers A and B are preferably supplied with a reducing or non-oxidizing gas such as hydrogen, nitrogen or other vapors of similar property. In certain cases, molten metal may be circulated through chamber A for heat treating, or the wire may be heat treated by passing current through the wire in chamber A.

The wire then passes through die 14 into the chamber C in which the wire is electro-cleaned. As previously stated, pipe C is connected to a positive source of direct current and the dies 14 and 15 are cathodically connected to such a source of current. Pipe C is resistant to attack from the cleaning medium, which enters the inlet pipe 22 and exits from pipe 23.

Chamber D, constructed of acid-resistant pipe, is a pickling chamber into which the pickling medium enters through the inlet pipe 22 and exits from pipe 23. Any pickling solution that leaks through the spacer seal 21 enters the recovery chamber E, from which it is withdrawn through outlet passage 23e. Chamber E is not kept full, and the fluid from chamber E is recirculated to chamber D.

The wire then passes into chamber F where it is subjected to the fresh water spray by the members 24. The wire next enters the plating solution recovery chamber G which is constructed of chemical-resistant material. The purpose of chamber G is the same as chamber E, to recover plating solution which leaks through the seal 21. It will be noted that in passing through the chambers E, F and G, the wire has not been subjected to any die-drawing step. Thus, good adhesion of the primary plated coating to the wire is effected.

The pipes of the two sections H are connected anodically to a source of direct current and act as insoluble anodes for the plating of the wire. The plating solution enters inlets 22h and exits from outlets 23h. The dies 16 and 17 are of plating-solution resistant material and are electrically conductive. They are cathodically connected to the plating generator, the wire making positive cathodic contact to the die during drawing.

The wire then passes into section I which is a final rinsing section, to be used for removing any traces of plating solution salts from the wire before it is finally heat treated. It then passes to the heating chamber A and subsequently to the cooling chamber B, from which it is finally drawn through die 19 and stored on the wind-up reel 12.

It is to be noted that the flow of the solution in the various chambers is counter to the direction of movement of the wire, but the flow may be reversed if desired.

The apparatus and method of coating and drawing wire will now be described in connection with Fig. 2 of the drawing.

It is similar to that of Fig. 1 except that no heating and cooling is employed before or after plating. It consists of treating sections C', D', E', F', G', H', K', H'', K'', H''' and I'. Sections C', D', H', H'' and H''' in which electrolytic action takes place, are uniformly tapered toward some central point to provide uniform current density on the wire. If the anode and cathode were equidistant at all points, there would be a non-uniform current density resulting from the resistance drop through the wire.

The ratio of the inside pipe diameter at the smallest point to the inside diameter of the pipe at the die ends depends upon certain constants determined by desired operating conditions.

Satisfactory adhesion of an electrodeposit may be had on a freshly drawn surface, providing no oily lubricants, such as soaps and oils, are used; provided oxygen is not trapped in the pores of the metal during drawing operations; and provided the metal is sufficiently ductile and has sufficient atomic attraction to a previously drawn surface. It is desirable to deposit relatively thin layers of metal between the drawing operations because of the ductility and freedom of imperfections characteristic of thin electrodeposited coatings. In cases where satisfactory adherence is not obtained, it is advantageous to slightly etch the drawn surfaces or electrically treat it before depositing the next layer.

Dies 26, 27, 28, 29, 30 and 31 are interposed between the sections as shown. Spray nozzles 24 are provided in the rinsing chamber F''. The sections and dies are anodically and cathodically connected to generators 32, 33, 34, 35, 36 and 37, as shown. The plating, drawing and rinsing steps are the same as described in connection with Fig. 1, except that the heat treating and cooling is omitted, and etching sections K' and K'' are provided between the plating sections H', H'' and H''' to eliminate polished surfaces, which may prevent tight adhesion of subsequent coatings in certain cases.

Figure 2:
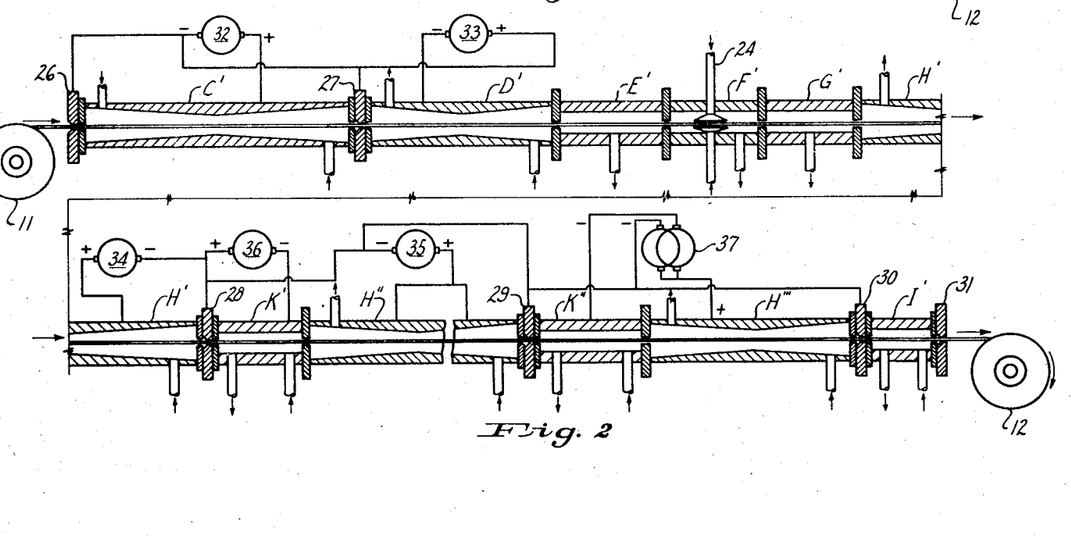
Fig. 2 is a similar view in two parts of a modified form of apparatus.

In the structure of Fig. 2, the etching sections K' and K'' are employed as the anodic electrolytic etchant, the current being supplied from a separate source, as shown. The electro-cleaning generator 32 has its positive connection to section pipe C' and its negative connection to the wire at the entrance die 26. The electric pickling generator 33 provides a positive connection to the wire at die 27 and a negative connection to pipe D'. These connections may have reversed polarity of anodic cleaning and/or cathodic pickling of the wire is desired.

The two plating generators 34 and 35 are connected negatively to the wire at dies 28 and 29 while the positive generator connections are to the pipes H', H''. The etching generator 36 connects positively to the wire at die 28 and negatively to the pipe section K', and generator 37 shows a double commutator set delivering current to the last plating section H''' and etching current to the last etching section K''. In some cases, alternating current may be applied between the wire and the wall in the etching section to give sufficient action on the drawn surface to subsequently produce an adherent electrodeposit. The plating current is provided by one of the commutators, which is negatively connected to the wire at the die plate 29 and positively connected to the pipe section H'''. During the plating operation, superimposed alternating current of desired voltage and frequency may be employed on the direct current to promote better adherence of the deposit to the drawn surface.

The etching current is produced by a higher negative potential than that used for plating and is connected to the pipe section K'', and because of a difference of potential between the wire at die 29 and the pipe section K'', the wire connected to section K'' will be anodic to the pipe of section K'' which produces electro-etching of the wire surface. In some cases the plating solution itself is a very good etchant for the drawn surface of the coating, and sufficient chemical action may result in the etching section without the use of current.

The dies between sections are of progressively greater hole diameter from the incoming to the outgoing end of the apparatus, so that when the coating builds up as the wire progresses through the apparatus, the coating is subjected to only a slight drawing at each die, sufficient for smoothing, with the base wire material suffering but slight elongation and hardening as it emerges from the final plating section. By this arrangement of dies, a wire of a given diameter may be coated with a smooth dense uniform electrodeposit of any thickness, and the dies as they become worn may be progressively moved from the starting to the finishing end of the apparatus. In other cases, the die holes may be of uniform size throughout the apparatus, in which case the coating and base wire are both elongated by successive plating and drawing operations.

Unless otherwise herein described, like parts such as the inlet and outlet pipe connections are as described in connection with Fig. 1 of the drawing.

Heating of the medium for annealing or for the chemical or electrical operations may be supplied by helically wound electrical heating coils wrapped around the outside of the chamber pipe sections.

Figures 3, 4, 5, 6:
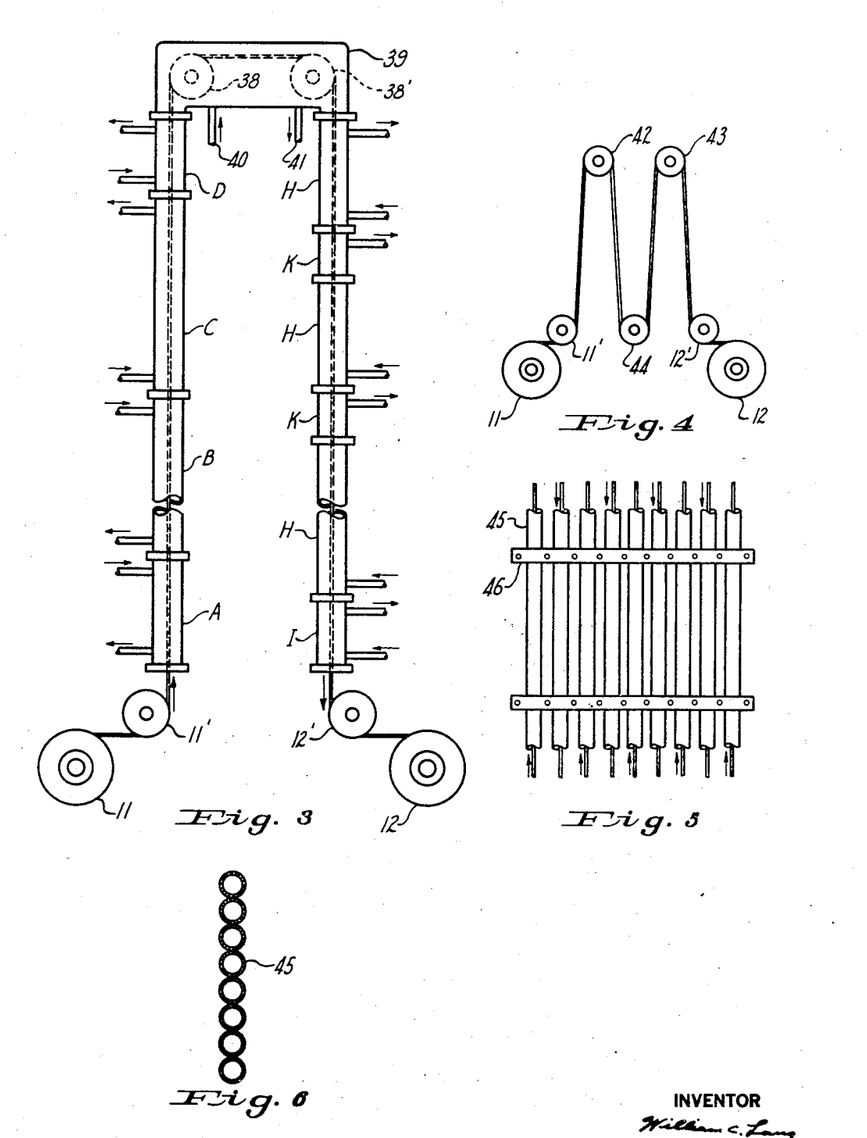
Fig. 3 is a front elevational view of a vertical form of apparatus.
Fig. 4 a diagrammatic view illustrating the modified form of wire travel from that shown in Fig. 3.
Fig. 5 a portion of a vertical chamber section between dies or spacers showing alternate direction of travel of the wires where a vertical arrangement is employed.
Fig. 6 a cross-sectional view of a horizontal type of apparatus similar to that shown in Figs. 1 and 2 illustrating the manner for coating eight wires in parallel.

Fig. 3 discloses in elevation apparatus similar to that described in connection with Figs. 1 and 2, except that the pipe sections are vertically instead of horizontally disposed, the heat treating, cooling, cleaning and pickling steps being carried out on the up-going side as indicated by the arrows, and the plating, etching and rinsing steps being carried out on the down-going side of the apparatus. In addition to the pay-off and wind-up reels 11 and 12, wire guiding idler pulleys 11' and 12' are employed and a driven roll 38 is employed on the cross member at the top of the apparatus around which the wire makes one or more complete wraps to relieve the tension on the wire. The upper drive and guide pulleys 38 and 38' are disposed in a water-tight or air-tight housing to prevent oxidation of the surface of the wire while passing through the chamber. The water or reducing gas or other medium employed in the upper housing, designated by the numeral 39, is charged into the housing by conduit 40 and withdrawn at conduit 41, as indicated by the arrows.

The apparatus and process of Fig. 3 need not be further described as its function appears to be obvious from the description of Figs. 1 and 2 of the drawings, the vertically disposed treating chambers of Fig. 3 being advantageous in reducing floor space necessary for a coating installation.

As exemplified by the diagrammatic showing of the wire travel in Fig. 4, other arrangements of pulleys and disposition of treating chambers may be made. In the arrangement of Fig. 4, the upper rolls 42 and 43 may be pulling rolls to relieve the tension on the wire while the bottom roll 44 may be a pulling roll or an idle roll.

In Fig. 5 an arrangement of 9 treating chambers vertically disposed in parallel is illustrated. The pipe sections or treating chambers designated by the numeral 45 may be supported by brackets 46. The wire may enter and be discharged from both ends of the apparatus as shown or they may all travel in the same direction from one end to the other of the treating apparatus.

In Fig. 6 the plural arrangement of parallel treating sections is shown vertically disposed, and the treating sections are preferably supported by a vertical standard or support at and/or intermediate the ends thereof.

Figure 7:
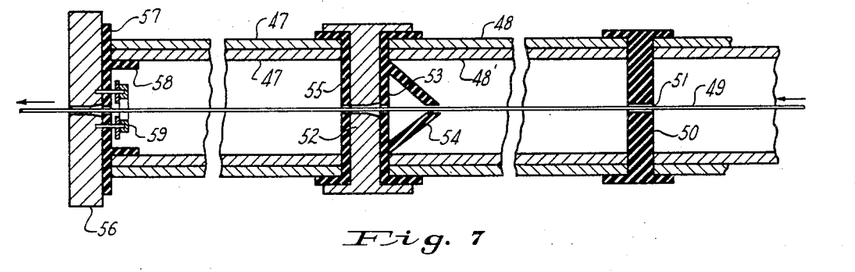
Fig. 7 a cross-sectional view through two chambers of a wire plating section illustrating the use of spacer cylinders.

Fig. 7 is a cross-section of a plurality of treating sections designated by the numerals 47 and 48, having inner pipes or tubular housings 47' and 48' of a material suitable to the particular liquids employed. The wire travel is in the direction as shown by the arrows and initially enters a spacer seal 50 which is of an electrolytic non-conducting solution-resistant material. The opening 51 of the spacer seal is large enough to clear the wire 49 without any rubbing off of the wire surface. The wire enters the chamber of section 48, receives an electrodeposited coating and leaves through die 52 where it receives a drawing treatment for smoothing the coating.

Before entering the die, wire 49 passes through a gasket seal 53 of electrolytically nonconducting material, having a conical section 54 extending inwardly of the treating section 48. On leaving the die 52, the wire passes through another gasket seal 55. After passing through treating chamber 47, the wire receives another drawing treatment in the die 56. A gasket seal 57 abuts the die 56 and is provided with a cylindrical sealing surface 58. An electrical conducting shielding washer 59 is disposed around the wire and is secured by the die 56 to which it is electrically connected. The various ways of shielding the dies as illustrated in Fig. 7 is necessary to prevent clogging due to the plating action. Consequently, the gasket seals 53, 54, 55 and 57 should provide very close fitting orifices to just clear the wire without rubbing on the wire surface. A soft rubber may be employed for the sealing gaskets, in which case light rubbing on the wire is not injurious.

It is to be noted that the shape of the dies and gaskets are such as to align the treating sections, the dies, the gasket orifices and wire. The shielding washer receives plating in preference to the die 56. Any deposit of metal on the shielding washer 59 may be removed periodically by chemical or electro-chemical dissolving means.

Figure 8:
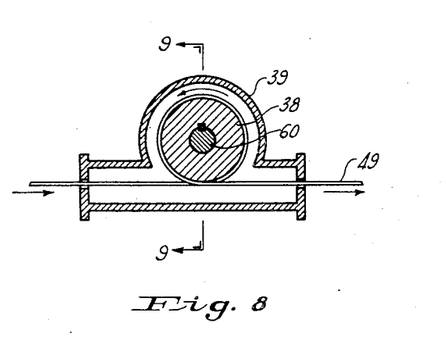
Fig. 8 a cross-sectional view taken along the line 8—8, Fig. 9.
Figure 9:
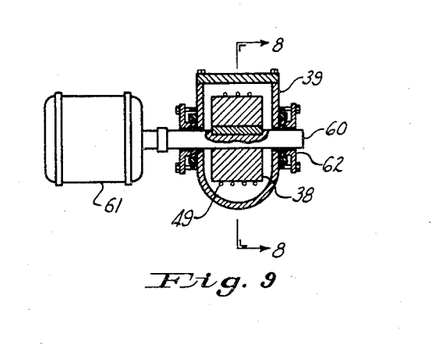
Fig. 9 a cross-section partially in elevation taken along the line 9—9, Fig. 8, of a tension regulating or pulling device.

In Figs. 8 and 9, a tension regulating device is shown, such as the drum 38 of Fig. 3. The wire 49 is shown wrapped several turns around the pulley, and the latter is disposed within the housing 39 and mounted on shaft 60 driven by motor 61. The shaft is sealed by the gasket 62 to constitute the housing an air-tight or liquid-tight compartment.

Figure 10:
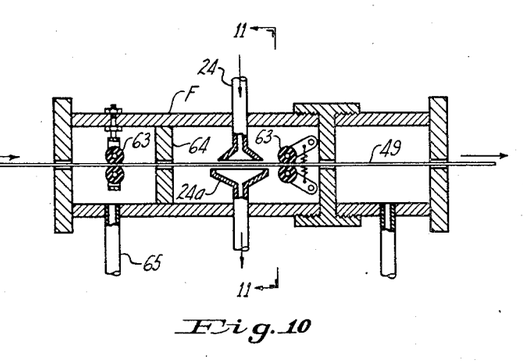
Fig. 10 a cross-sectional view of a spray rinsing section.
Figure 11:
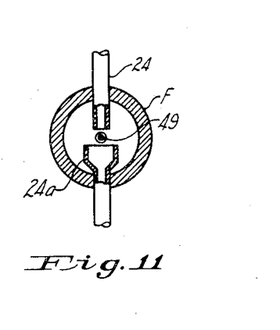
Fig. 11 a cross-sectional view thereof taken along the lines 11—11, Fig. 10.

In Figs. 10 and 11, a rinsing section is shown which may be employed as the section F of Figs. 1 and 2 of the drawings, it being so marked. The wire, in passing through the rinsing section, is engaged by spring loaded squeegee rolls 63. These rolls, which may be of soft rubber or similar material, remove any solution adhering to the wire from previous treatment.

The baffle 64 in chamber F is welded to the inner wall of the pipe section F. The spray nozzles may be constructed so that the lower member 26a acts as a funnel.

Figure 12:
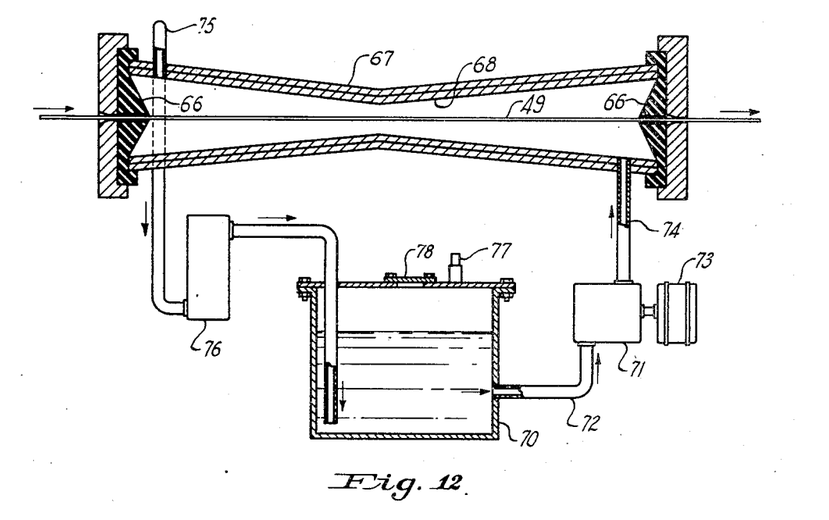
Fig. 12 a cross-sectional view partially in elevation of still another form of plating chamber with its solution circulation system.

Fig. 12 illustrates a plating chamber and a solution circulation system. In this construction, sealing gaskets of conical shape designated by the numeral 66 are employed. The construction of the treating sections differ from that shown in Fig. 2 in that the outer and inner diameters of the section are both constricted at some point near the center thereof to maintain uniform current density on the wire. The treating section of Fig. 12 is of the bimetallic type, having an outer supporting member 67 and an inner lining member 68 that is coated for use as an insoluble anode with a chemical-resistant material.

The solution circulation system is completely enclosed and consists of a storage tank 70 having a pump 71 connected by a conduit 72. The pump is driven by motor 73 and the solution is delivered to the treating section by conduit 74. The solution is returned to the sump or tank 70 by outlet conduit 75 and passes through a filter 76 to the tank.

Any gas pressure in the solution tank 70 is released through a vent or release valve 77, and chemicals may be added to tank 70 through an opening in the cover of the tank, controlled by a closure plate 78.

Figure 13:
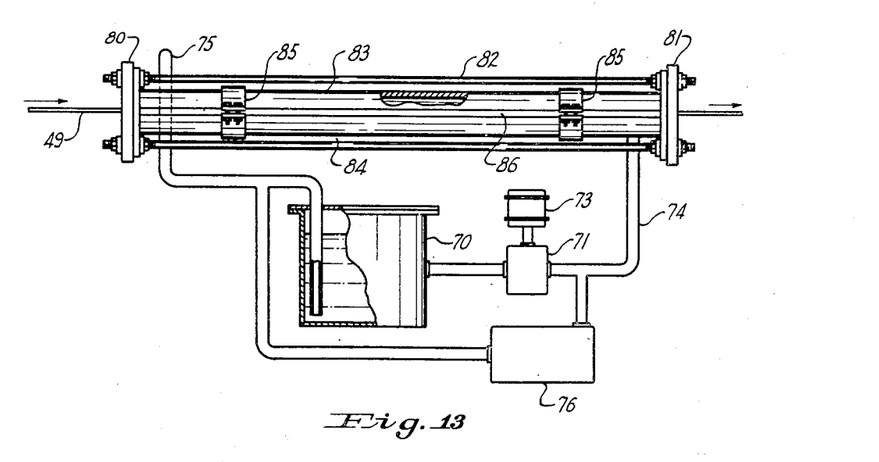
Fig. 13 a side elevational view partially in section of still another form of plating chamber with its solution circulation system.

Fig. 13 illustrates still another form of plating chamber with its solution circulation system. The wire enters and leaves through gasketed die plates 80 and 81 which are bolted together by tie-rods 82. The treating section is a split member and the two halves 83 and 84 are joined by split clamps 85, a sealing gasket 86 being disposed between the abutting faces of the sections. By this construction, the treating sections may be removed without unthreading the wire from the apparatus, and is adapted for use with insoluble or soluble anode pipes. The circulating system is similar to that shown in Fig. 12 except that the filter is not in series with the chamber inlet and outlet pipes, but in parallel with the storage tank and pump.

Figure 14:
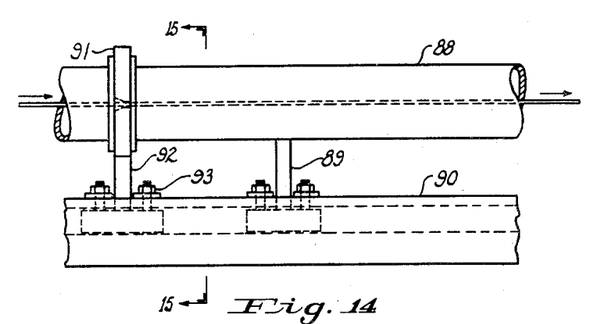
Fig. 14 a side elevational view of a supporting means for the apparatus.
Figure 15:
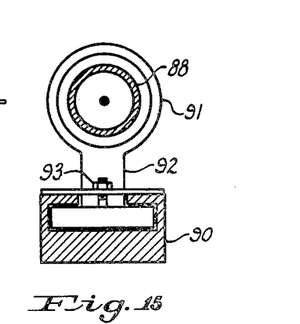
Fig. 15 an end cross-sectional view taken along the line 15—15, Fig. 14.

Fig. 14 illustrates a side view and Fig. 15 a cross-section of a supporting means for the treating apparatus. The treating section 88 is provided with a support 89 that is mounted in a T-slotted base 90. The die 91 is similarly mounted by a support 92 to the T-slotted base 90, the supports 89 and 92 being electrically insulated from the pipe 88 and the die 91 respectively. These supports may be fastened or released by clamping bolts 93 and moved horizontally in the T-way of the bottom support 90.

Figure 16:
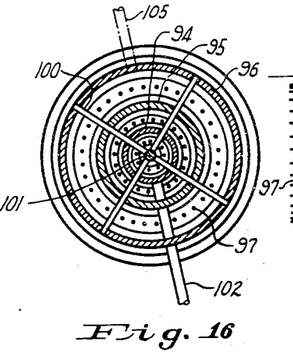
Fig. 16 a cross-sectional view taken along the line 16—16, Fig. 17.
Figure 17:
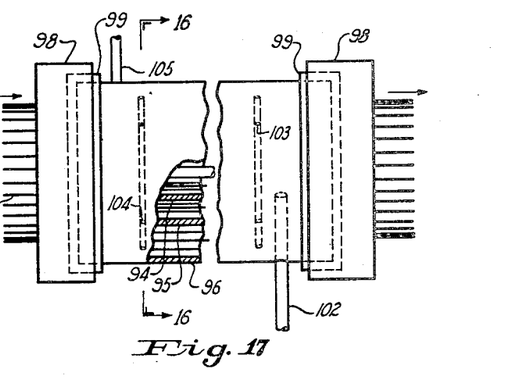
Fig. 17 a side elevation partially in section of still another form of plating chamber.

Fig. 16 illustrates another form of plating chamber which employs three concentric pipes 94, 95 and 96 as separate chambers for coating multiple wires, generally designated by the numeral 97. The numeral 98 designates the die plates through which the wires are drawn, and numeral 99 designates the gasket seals. The pipes are properly spaced and supported by rods 100 which attach to a center rod 101 which also serves as an insoluble anode.

The solution circulation system provides an inlet pipe 102 that charges the chamber of the inner pipe from which it is delivered through ports 103 and 104 to the outer treating chambers, and thence through the outer flow pipe 105 to the sump. This arrangement provides a method of coating a multitude of wires in a smaller space when it is not a disadvantage to have anodes on only two sides of the wire instead of all around its circumference.

Figure 18:
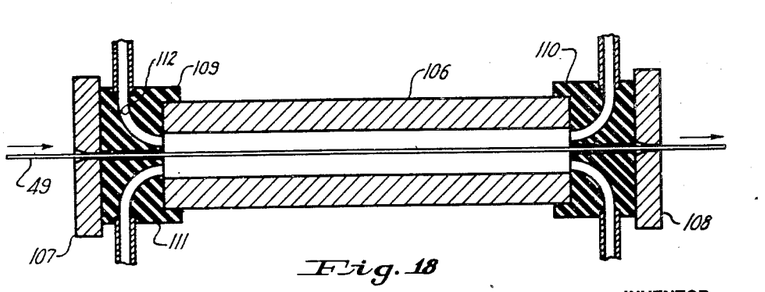
Fig. 18 a cross-sectional view of a pipe chamber especially adapted for use with soluble anode pipes.

In Fig. 18 is shown a pipe chamber especially suited for use with soluble anode pipes. The chamber section is designated by the numeral 106. The wire enters through the die 107 and exits at the die 108. Intermediate the die and the sections are non-conducting gasket seals 109 and 110 which have solution inlet and outlet orifices 111 and 112. The flow passages of the gaskets are rounded to permit a low pressure drop at high solution velocity.

It is evident from the foregoing description of the invention that the process and apparatus described therein is especially adapted to simultaneously alternate electro-plating and drawing of metallic coatings on a metallic wire by continuous operation. It is further adapted to the production of coated ferrous or non-ferrous metallic wire at a very high rate of speed without loss of solution from drag-out on the wire. The apparatus is also constructed to exclude the atmosphere from the wire and the plating solutions, and to prevent solution spray such as may result from gas evolution.

The equipment also employs the plating solution as a lubricant and coolant for the wire drawing operation, and permits of the use of extremely high cathode current density during plating, with the removal of any adhering bubbles from the wire. The invention further provides for a uniform short distance from anode to adjacent cathode wire with an anode current density substantially less than the cathode current density during plating.

As previously pointed out, one of the important functions of the equipment is to maintain a uniform current density on the wire throughout the plating sections.

Soluble and insoluble anode pipes may be used. The soluble anode pipe may be of any desired wall thickness and may employ separate soluble inlet and outlet pipes of electrically non-conducting material so that the unused portion of the pipe may be remelted and recast, extruded or otherwise reformed. When insoluble anodes are employed, they are suitably formed from solution insoluble material, or such material may be electroplated or cast on the inner wall of the section.

The cleaning section D may be operated as an alkaline chemical cleaner employing no current or it may be employed as a cathodic or anodic electrolytic cleaner for the wire. Aqueous solutions or molten salts may also be employed. Hot or cold solvents may be employed as a liquid solvent cleaner or as a solvent degreaser, or vapor solvents may be employed.

Where molten salts or gases at high temperatures are utilized in the cleaning or pickling sections, they are preferably followed by a cooling section containing solutions or reducing or non-oxidizing gases at low temperatures to reduce the temperature of the wire before it advances to the next adjacent section. Also if desired, hardening of the wire may be accomplished by quick quenching by employing water in such additional cooling sections.

If gases are evolved during the plating operation, they may be bled off from the enclosed storage tank at a point above the solution level and may be collected and used for other purposes.

It is also quite feasible to employ aluminum or other metallic powders in the plating chambers instead of the electrolytic plating, which powders would readily attach themselves to the wire after pickling and form a lubricant for the subsequent drawing operations. The powder materials would be worked into the surface of the wire to form a smooth glossy coating.

Furthermore, the enclosed system has the advantage of excluding all foreign matter and the atmosphere, and prevents escape of solution by spray or gas evolution during electrolysis. Such a system may also be thermally insulated to reduce heat losses from hot solutions. Heating or cooling may be accomplished by heat exchangers, coils or immersion heaters in the storage tank or by helically wound thermally and electrically insulated electrically heating coils. Cooling fins may be cast on the wall of the pipe sections to increase radiation for cooling, and the pipe sections when employed as insoluble anodes may be jacketed for the circulation of steam for hot or cold water.

Because of the compactness of the chambers, much higher solution velocities are practical than in commercial plating tanks heretofore employed because a much smaller volume of solution is utilized and pumped. Such minimum volumes of solution permit of extremely high cathodic current densities which are impossible with slow solution circulation and agitation. The inside of the pipe sections may be constructed with radial, longitudinal or spiral fins to produce a swirling effect to the solution, resulting in greater agitation and increasing the anode area for even higher cathodic current densities.

Plating solutions employed in the apparatus may be of the conventional type well known in the art, and their nature will depend upon the metal or alloy to be plated. Water soluble materials and colloids including surface tension depressants such as the aromatic sulfonic acids, fatty alcohol sulphates, sulphanated oils, sulphonated ethers and organic materials, such as glycerin, the ethanolamines, the ethylene glycols, gums, sugars and the like may be added to the plating solutions to assist in the lubrication of the dies for the drawing operations.

The choice of plating solutions is large due to the alternate plating and drawing operations, and solutions not satisfactory for plating heavy coatings in conventional tanks may be perfectly satisfactory for use in the present apparatus because of the compacting of the coating metal during the drawing operations after plating like coatings.

It is apparent that the apparatus and method herein disclosed is adapted to the production of wires of very small diameters such as molybdenum, tungsten and similar refractory wires. To this end, the pipe sections of the apparatus may be employed for dissolving the wire chemically or electro-chemically with the dies set to have progressively smaller hole diameters from the start to the finish end of the apparatus, each die giving only sufficient reduction of the diameter for smoothing the surface, the bulk of the metal being removed chemically or electrochemically. In case only chemical etching is used, the dies or die inserts may be of hard non-conducting material such as diamond, tungsten carbide and the like.

When the apparatus is employed for hot coatings of metallic wire with dissimilar metal or alloys, the interposed dies may be of alloy steels, metallic carbides, diamonds or the like, the die openings being of suitable diameter to remove any excess coating metal, leaving a coating of desired thickness. Where the coating metal alloys with the wire, the dies may be of suitable diameter to draw the wire, leaving only an alloy of the coating metal and the wire metal on the surface. These advantages are obtainable from the completely enclosed system for the molten bath which prevents oxidation of the coating metal during heating conditions. Fluxes may be employed in pipe sections ahead of the section where the hot dip coating takes place, but may not be necessary since the atmosphere is excluded from the molten metal. Such operations may likewise be advantageously conducted in a vertical plane to prevent rubbing of the wire on one side of the die opening, which would result in uneven coating on the wire.

The apparatus and method is ideally adapted to the production of copper wire, copper clad steel wire, electro-tinning of copper and steel wire, electro-galvanizing of steel wire, lead coating of steel wire or miscellaneous coating of ferrous or non-ferrous wires with metals or alloys such as bronze, silver, terne, cadmium, tin, copper, zinc or lead and with separate layers of two or more metals of two or more alternate layers.

Although several embodiments of the invention have been herein illustrated and described, it will be evident to those skilled in the art that various modifications may be made in the details of construction and in the arrangement of the several operating parts without departing from the principles herein set forth. Thus it will be evident that the pipe sections may be flanged with proper electrical insulation therebetween and between the dies and flange bolts.

I claim:

1. Apparatus for coating wire by continuous process comprising an electrically-conducting fluid-containing cylindrical treating chamber of varying inside diameter, electrically conducting drawing dies at the ends of the chamber, but insulated from the chamber, and an electric current supply means for supplying current to said chamber and to said dies, the wire to be treated passing through said dies and said chamber on the line of axis of said chamber, the walls of said chamber being of larger diameter at the ends and uniformly tapering to an intermediate smaller diameter at the center of the chamber so as to maintain uniform current density on the wire in its travel throughout the length of said chamber.

2. Apparatus for coating wire by continuous electrolytic process comprising a plurality of electrically conducting cylindrical sections, in end to end relation, having their ends insulated from each other, electrically conducting drawing dies interposed between some of said sections, an electric current supply means supplying current to the drawing dies and to the sections, and means for circulating an electrolyte through the sections, some of said sections having inner walls of larger diameter at the ends and tapering uniformly from the ends toward an intermediate smaller diameter at the center of the chamber to maintain uniform current density on the wire.

3. Apparatus for coating wire by continuous electrolytic process comprising a plurality of electrically conducting pipe sections in end-to-end relation, having their ends insulated from each other, each of said sections having a fluid entrance at the bottom on one end and a fluid exit at the top on the opposite end for circulation of fluid in said sections and for the elimination of gas pockets of any accumulated gas in the section, the sections having interposed electrically conducting drawing dies between some of said sections, an electric current supply means supplying current to the drawing dies and to the sections, and the walls of some of said sections being of larger diameter at the ends and tapering uniformly toward an intermediate smaller diameter at the center of the chamber to maintain uniform current density on the wire.

4. Apparatus for coating wire by continuous electrolytic process comprising a plurality of electrically conducting, cylindrical treating sections insulated from each other and arranged in end to end relation, electrically conducting drawing dies interposed between some of said sections, an electric current supply means supplying current to the drawing dies and to the sections, means for circulating an electrolyte through the sections, the walls of some of said sections being of larger diameter at the ends and tapering uniformly from the ends toward an intermediate smaller diameter at the center of the chamber to maintain uniform current density on the wire, and means for conveying the wire through the treating sections and dies including means for reducing the tension on the wire during its travel through said sections, comprising a power drive engaging the body of the wire at a point intermediate the ends of the treating section.

5. Apparatus for coating wire by continuous electrolytic process comprising a plurality of electrically conducting pipe sections in end-to-end relation, having their ends insulated from each other, each of said sections having a fluid entrance at the bottom on one end and a fluid exit at the top on the opposite end for circulation of fluid in said sections and for the elimination of gas pockets of any accumulated gas in the section, the sections having interposed electrically conducting drawing dies between some of said sections, an electric current supply means supplying current to the drawing dies and to the sections, and some of said sections having inner walls tapering uniformly toward an intermediate point to maintain uniform current density on the wire, and means for conveying the wire through the treating sections and dies including means for reducing the tension on the wire during its travel through said sections, comprising a power drive engaging the body of the wire at a point intermediate the ends of the treating section.

WILLIAM C. LANG.

REFERENCES CITED

The following references are of record in the file of this patent:

UNITED STATES PATENTS

| Number | Name | Date |
|---|---|---|
| 396,437 | Smith | Jan. 22, 1889 |

(Other references on following page)

UNITED STATES PATENTS

| Number | Name | Date |
|---|---|---|
| 742,443 | Johnson | Oct. 27, 1903 |
| 799,860 | Meaker | Sept. 19, 1905 |
| 816,280 | Tuttle | Mar. 27, 1906 |
| 1,058,048 | Gibbs | Apr. 8, 1913 |
| 1,069,151 | Loewenthal | Aug. 5, 1913 |
| 1,077,894 | Stevens | Nov. 4, 1913 |
| 1,103,382 | Siefert | July 14, 1914 |
| 1,120,191 | Gibbs | Dec. 8, 1914 |
| 1,169,819 | Henderson | Feb. 1, 1916 |
| 1,590,599 | Taylor | June 29, 1926 |
| 1,709,523 | Delavie et al. | Apr. 16, 1929 |
| 1,805,236 | Connet | May 12, 1931 |
| 1,862,138 | Meaker | June 7, 1932 |
| 1,897,902 | Harsanyi | Feb. 14, 1933 |
| 1,970,804 | Kerk | Aug. 21, 1934 |
| 1,995,528 | Williams | Mar. 26, 1935 |
| 2,075,331 | Antisell | Mar. 30, 1937 |
| 2,142,486 | Antisell | Jan. 3, 1939 |

FOREIGN PATENTS

| Number | Country | Date |
|---|---|---|
| 11,547 | Great Britain | 1895 |
| 683,169 | Germany | Oct. 30, 1939 |